United States Patent [19]

Fletcher et al.

[11] 4,092,274

[45] May 30, 1978

[54] POLYMERIC FOAMS FROM CROSS-LINKABLE POLY-N-ARY LENEBENZIMIDAZOLES

[76] Inventors: James C. Fletcher, Administrator of the National Aeronautics & Space Administration with respect to an invention of; Edward S. Harrison, San Diego; Chadwick B. Delano, Sunnyvale; Salvatore R. Riccitiello, San Jose, all of Calif.

[21] Appl. No.: 708,951

[22] Filed: Jul. 26, 1976

[51] Int. Cl.² .............................................. C08V 9/02
[52] U.S. Cl. .............................. 260/2.5 N; 260/47 CP; 260/63 N; 260/78.41
[58] Field of Search ............... 260/78.41, 2.5 N, 63 N, 260/47 CP

[56] References Cited

U.S. PATENT DOCUMENTS

| Re. 26,065 | 7/1966 | Marvel et al. | 260/78.4 R |
|---|---|---|---|
| 3,541,199 | 11/1970 | Bohrer et al. | 260/2.5 N |
| 3,549,603 | 12/1970 | Chenevey et al. | 260/2.5 N |
| 3,551,389 | 12/1970 | Prince, Jr. | 260/78 TF |
| 3,708,439 | 1/1973 | Sayigh et al. | 260/2 X |

*Primary Examiner*—Morton Foelak
*Attorney, Agent, or Firm*—Darrell G. Brekke; John R. Manning

[57] ABSTRACT

Foamed cross-linked poly-N-arylenebinzimidazoles are prepared by mixing an organic tetraamine and an ortho substituted aromatic dicarboxylic acid anhydride in the presence of a blowing agent and then heating the prepolymer to a temperature sufficient to complete polymerization and foaming of the reactants. In another embodiment of the process, the reactants are heated to form a prepolymer. The prepolymer is then cured at higher temperatures to complete foaming and polymerization.

6 Claims, 11 Drawing Figures

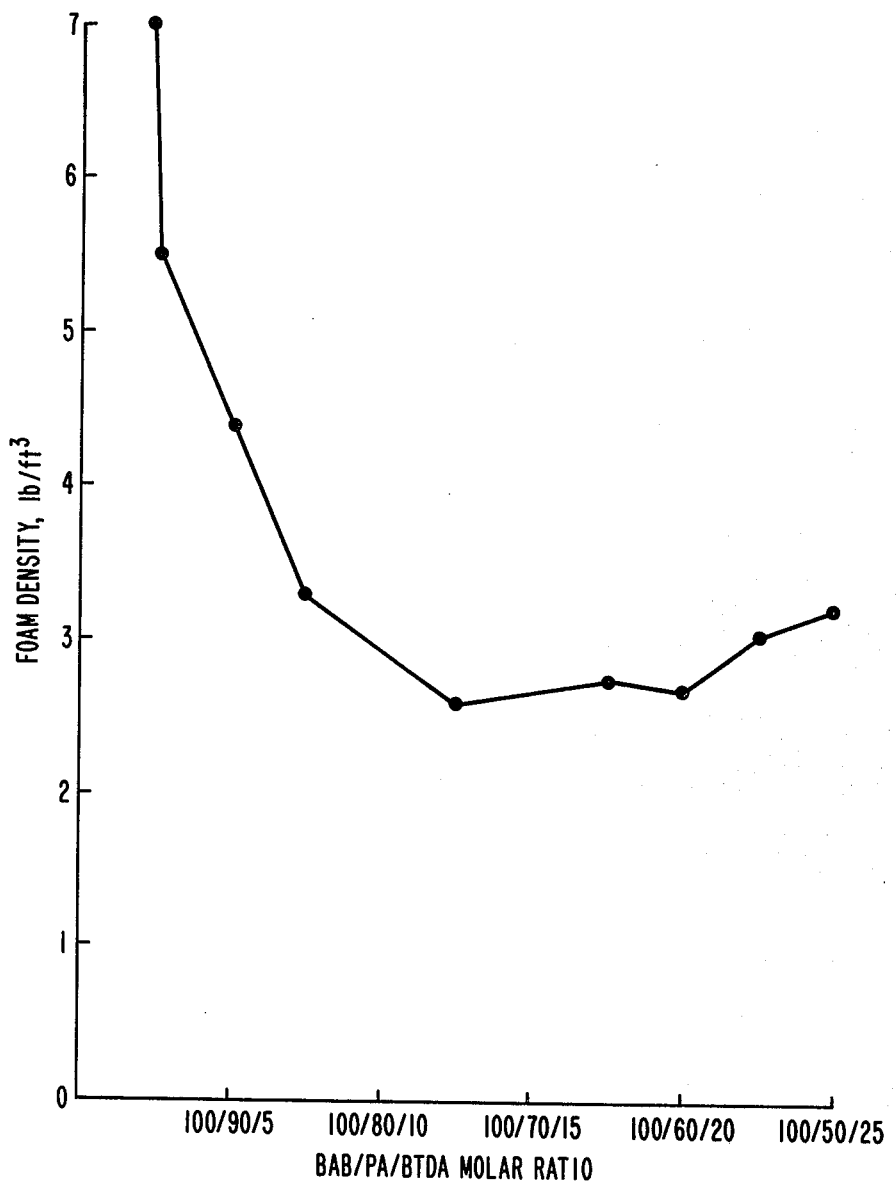

POLYMERIC FOAMS FROM CROSS-LINKABLE POLY-N-ARYLENEBENZIMIDAZOLES

ORIGIN OF THE INVENTION

The invention described herein was made in the performance of work under a NASA contract and subject to the provisions of Section 305 of the National Aeronautics and Space Act of 1958, Public Law 85-568(72 stat. 435; 42 USC 2457).

BACKGROUND OF THE INVENTION

1. Field of the Invention

The present invention relates to a polymeric foam material prepared from poly-N-arylenebenzimidazole. More particularly, the present invention relates to a cross-linked poly-N-arylenebenzimidazole material of especially low foam density.

2. Description of the Prior Art

Recently, several methods of preparing polybenzimidazole materials have been reported in which the linking units of the polymer have the following structure:

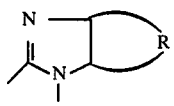

U.S. Pat. No. 3,708,439 shows a method of preparing poly-N-arylenebenzimidazoles by reacting certain organic tetraamines with aromatic dicarboxylic acids or their phenyl esters. However, while foamed arylenebenzimidazoles can be prepared by this reaction, the reaction does not result in a polymeric material of especially low density. In the polymerization reaction the organic tetraamine and diphenyl ester starting materials are either melt condensed or reacted in the presence of an organic solvent such as phenol, m-cresol or the like. During the reaction, the reacting starting materials release phenol and water as volatile by-products which supplement the organic solvent as a blowing agent in the reaction. The release of these volatile materials necessitates the adjustment of the foaming schedule to compensate for the continuously slow production of the volatile by-products which complicates the reaction.

Another reference (U.S. Pat. No. 3,551,389) shows a technique of preparing polybenzimidazoles by melt condensing an organotetraamine initially with an aromatic dicarboxylic acid derivative such as the diphenyl ester or anhydride to form a prepolymer. Thereafter, the prepolymer is heated to an elevated temperature in the presence of added amounts of phenol, optimumly of about 10%, to complete foaming and polymerization of the benzimidazole prepolymer. However, the benzimidazole polymers are not of the N-arylene-type, and are not of especially low density.

Another reference (U.S. Pat. No. 3,784,517) shows a method of forming polybenzimidazole fibers in which an aromatic tetraamino compound is reacted with a dephenyl ester or anhydride of an aromatic dicarboxylic acid in a one-step process in a high boiling organic solvent such as sulfolane or phenyl sulfone. However, a foamed product of low density is not obtained and is only illustrative of a technique of forming polybenzimidazoles by a solution/slurry process.

Other techniques are known in which an aromatic dicarboxylic acid anhydride such as phthalic anhydride and an organic tetraamine such as 1,2,4,5 tetraaminobenzene are copolymerized to yield a foamed product (U.S. Pat. No. Re. 26,065). However, the polybenzimidazole product prepared by this procedure is not a low density foamed material, and is not of the N-arylene-type. A need, therefore, continues to exist for a foamed N-arylenepolybenzimidazole material of high melting and low density characteristics.

SUMMARY OF THE INVENTION

Accordingly, one object of the present invention is to provide a foamed N-arylene polybenzimidazole material of high melting and low density characteristics.

Another object of the present invention is to provide a highly cross-linked, foamed N-arylene polybenzimidazole material from a proper organotetraamine and an ortho substituted aromatic dicarboxylic acid anhydride.

Yet another object of the present invention is to provide a polybenzimidazole material of the N-arylene-type which has increased thermooxidative stability and better processability while at the same time being acceptable from an economic point of view.

Briefly, these objects and other objects of the present invention as hereinafter will become more readily apparent can be attained by a foamed, cross-linked poly-N-arylenebenzimidazole prepared by mixing an organic tetraamine and an ortho substituted aromatic dicarboxylic acid anhydride in the presence of a blowing agent and then heating the prepolymer to a temperature sufficient to complete polymerization and foaming of the reactants. In another embodiment of the process the organic tetraamine and the o-substituted aromatic dicarboxylic acid anhydride are initially partially polymerized to form a prepolymer, and thereafter, polymerization and foaming of the prepolymer is completed by heating the prepolymer.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

The FIGURE is a graph of foam density of N-arylenebenzimidazole as a function of varying 4,4-bis(o-aminoanilino)biphenyl/phthalic anhydride/benzophenone tetracarboxylic acid dianhydride molar ratios.

DETAILED DESCRIPTION OF THE PREFERRED EMBODIMENTS

The N-arylene polybenzimidazoles of the present invention are prepared by the condensation of an organo tetraamine with an appropriate aromatic dicarboxylic acid anhydride as a chain extending agent and have the following structure:

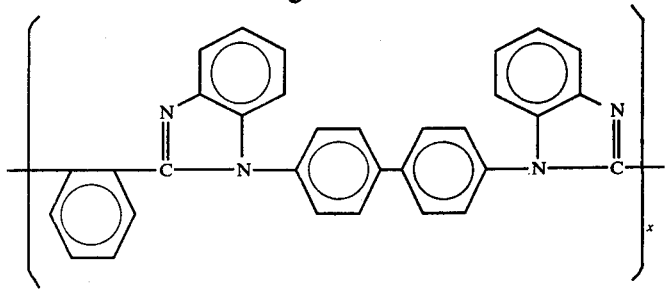

In another embodiment of the invention an aromatic tetracarboxylic dianhydride material is added as a co-reactant to the starting materials, which acts as a cross-linking agent giving rise to a product of high strength characteristics. The cross-linking agent also serves to remove incipient thermoplasticity which would preclude use of the material in high thermal fluxes. An important consideration in the selection of the dicarboxylic anhydride and organic tetraamine reactants of the present invention is that reactants must be selected which yield an N-arylene polybenzimidazole product. Generally, when an aromatic anhydride and an organic polyamino compound are reacted, a product is formed which has the pyrrone structure as shown by the following equation.

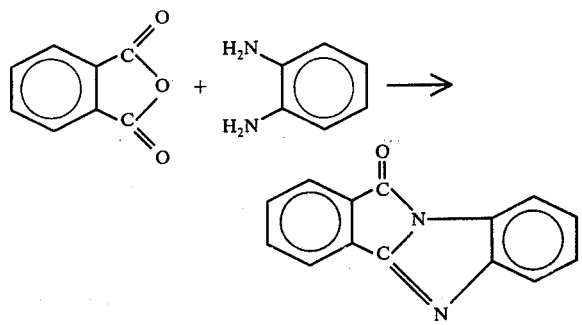

However, in the reaction of the present invention between the anhydride and organic tetraamine, no polymer is formed containing linking pyrone groups.

The ortho aromatic dicarboxylic acid anhydride and the specific types of organic tetraamines used as reactants in the present process were selected for investigation for the following reasons. The organic tetraamines shown below were selected from a cost point-of-view, and because it was believed better thermo-oxidative stability of the resulting polymer could be obtained since the resultant polymer lacks the imino hydrogen in the benzimidazole moiety which is the most probable point of oxidative destruction of the benzimidazole structure. The ortho aromatic dicarboxylic acid anhydrides are used in the reaction because of cost considerations and because it has been found that the anhydrides give rise to more rapid reactions rates than the conventional phenyl esters. The esters simply react too slow to result in the formation of quality, low density foam products.

In the preparation of the N-arylene benzimidazole polymer of the invention, the reactants can be mixed and then heated to polymerize the reactants and to foam the polymerized material. Alternatively, the mixed reactants can be initially, partially polymerized to form a prepolymer, and then heated to complete polymerization and foaming of the polybenzimidazoles.

In the reaction of the present invention suitable organotetraamines include those having the following structure which are also shown in U.S. Pat. No. 3,708,439.

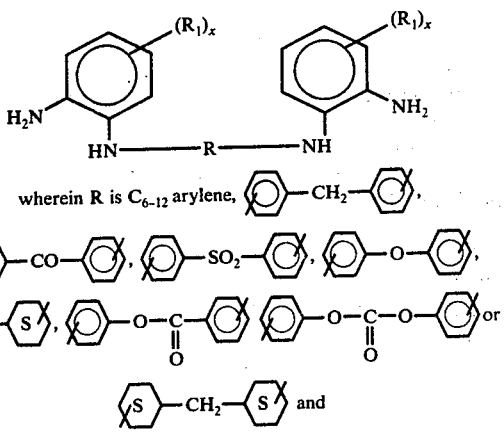

wherein $R_1$, is lower alkyl, lower alkoxy, or halogen and $X = 0-3$.

Suitable dicarboxylic acid anhydrides include any ortho substituted aromatic dicarboxylic acid anhydride such as phthalic anhydride, substituted phthalic anhydrides, naphthalene 1,2-dicarboxylic acid anhydride, naphthalene, 1,8-dicarboxylic acid anhydride and chlorendic anhydride; and ortho substituted hetero-atom containing aromatic dicarboxylic acids such as pyridine 2,3-dicarboxylic acid anhydride, pyridine-3,4-dicarboxylic acid anhydride, and the like. In the reaction of the anhydride with the the tetraamine, it is important that stoichisometric quantities of the reactants be used.

The polybenzimidazoles of the present invention are formed as illustrated by the following preferred embodiment in which phthalic anhydride and N,N'-bis(2-aminophenyl)-4,4'-diphenyl are reacted.

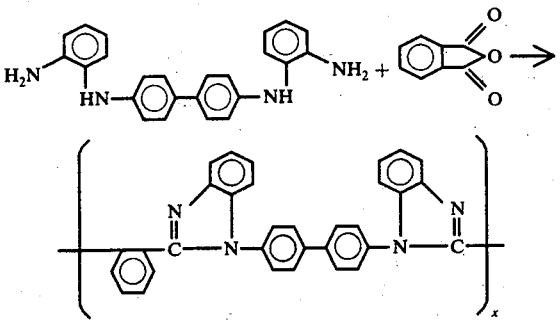

In the condensation reaction water is the only volatile by-product released. Unlike the prior art condensation reactions which employ various aromatic esters, an alcoholic by-product such as phenol is not released as a blowing agent. This means that the amount of flux (blowing agent) added to the polymerizing reactants can be independently varied which permits much finer control of prepolymer formation and reproducibility. Moreover, an advantage of the present process is that low molecular weight species can be generated. In the conventional polybenzimidazole procedures which use esters as reactants, phenolic by-product is continually being produced which complicates the foaming schedule of the polybenzimidazoles.

In another embodiment of the invention a tetracarboxylic dianhydride cross-linking agent is added to the reacting monomer mixture. The cross-linking dianhydride reactant can be used alone to react with the tetraamine to form a fully cross-linked product, or it can be used in combination with the aromatic dicarboxylic acid anhydride of varying amounts relative to the monoanhydride so long as reaction stoichiometry is preserved. Normally, from 2.5 mole % to 100 mole % of the cross-linking agent is used based on the total anhydride component of the reaction. The cross-link density of the final foamed product of the invention can be conveniently regulated by the amount of tetracarboxylic dianhydride cross-linking agent added to the reacting monomer mixture. Suitable cross-linking agents include those havint the formula:

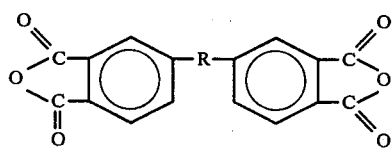

wherein R is $-C=O-$, $-C(CF_3)2-$, $-SO_2-$, $-O-$, $-NH-$, and the like. Preferably, 3,3', 4,4'-benzophenonetetracarboxylic dianhydride is used as the dianhydride cross-linking agent. The density of the cross-linked structure is controlled by the rate of reaction and by the volatile matter content of the polymerization medium. The density is not dependent upon the cross-linking agent. An example of the structure of the cross-linked polymer product obtained from the reaction of an organotetraamine with an ortho dicarboxylic acid anhydride and a dianhydride cross-linking agent is represented below.

reactants, and then reacted to form a partially foamed prepolymer. The viscosity of the prepolymer at this point is ninn $\leq 0.1$. After the prepolymer has been obtained, it is heated to complete polymerization and foaming of the product. Suitable blowing agents useful in the preparation of the foam include phenol and alkyl substituted phenols such as cresol. Since the blowing agent is introduced into the synthesis procedure in this manner and is not a reaction by-product, substantially greater control of the prepolymer formation can be achieved as well as improved reproducibility of the product. In the formation of the prepolymer the mixed blowing agent and reactants are heated to a temperature of 165° to 195° C under a pressure of one atm for 45 to 120 minutes, usually under an inert atmosphere such as nitrogen, argon, and the like. Normally, the appropriate monomer reactants and the dianhydride cross-linking agent, if desired, in the desired ratio are simply dissolved in the blowing agent. The amount of blowing agent used varies from 5 to about 50% based on the total weight of the mixture. The particular reaction time and temperature chosen is a function of the concentration of the reactants and of the particular tetraamine and anhydride chosen and particularly of the dianhydride cross-linking agent selected. It has been observed that with greater proportions of the cross-linking agent in the prepolymer obtained, there exists a greater tendency of the prepolymer reaction mixture to exhibit premature gellation because of the insolubility induced by the increased amount of cross-linking.

After the prepolymer has been formed, the reaction material is allowed to cool to room temperature and a solid prepolymer is obtained which contains the blowing agent. The solid prepolymer is then ground to a uniform small particle size by any convenient, well-known procedure, normally of about -60 mesh. The ground material is then placed in a suitable vented foaming fixture. The overall density of the foamed poly-

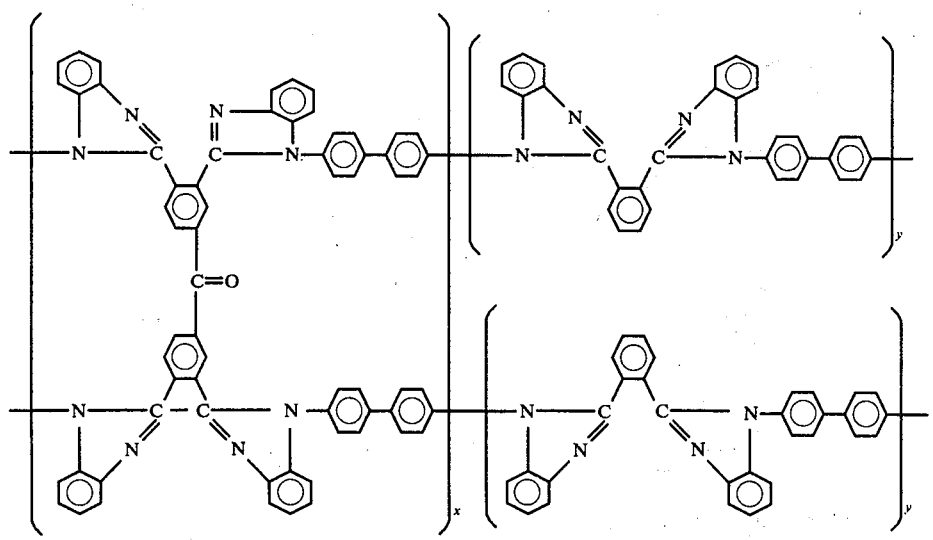

The specific reactants in this case are 3,3',4,4'-benzophenonetetracarboxylic dianhydride, phthalic anhydride and N,N'(o-aminophenyl)-4,4'-diaminobiphenyl, wherein x/y ranges from 0.025 to > 1.

In one embodiment of the preparation of the foamed polymer product of the present invention the reactants are combined and mixed with 5 to 50% of a suitable blowing agent based on the combined solid weight of mer product eventually obtained is determined by the charge mass of the prepolymer to the volume of the enclosing vessel.

After the prepolymer has been loaded in its confining vessel, it is then placed in a heater of any convenient type such as an oven and heated to an appropriate temperature of about 300°–400° F, normally about 300° F.

The reaction vessel is usually contructed so that only slight amounts of oxygen can intrude into the reactor. Otherwise, an inert atmosphere should be provided within the reactor. After the temperature of the prepolymer material has reached the predetermined temperature level, the temperature is increased at a programmed rate between 100° to 300° F per hour to a temperature of about 500° to 600° F, preferably 550° F. It is during the programmed heat treatment that completion of foaming of the prepolymer occurs and final polymerization and cross-linking of the prepolymer occurs. After the programmed high temperature is reached, the temperature is raised to 625° to 675° F and maintained at this temperature for about 10 to 45 minutes, preferably about 30 min. The polymer is postcured at a temperature of 750° to 790° F for 40 to 80 minutes under any suitable inert atmosphere such as nitrogen, argon, helium and the like.

If the foamed polymer of the present invention is not cross-linked, some residual thermoplasticity remains as evidenced by the net shrinkage and deformation of the post cured product. A cross-linking concentration as low as 2.5% removes the incipient thermoplasticity of the polymer so that dimensional change through the post-cure cycle of the polymer is essentially eliminated.

The foamed polymer of the present invention is useful as a structural or thermally insulative material in high temperature applications. It also can be used in applications where the self-extinguishing properties of the polymer are advantageous such as in high temperature insulation and fire survival systems used in the space shuttle and commercial aircraft.

Having now generally described this invention, a further understanding can be obtained by reference to certain specific examples which are provided herein for purposes of illustration only and are not intended to be limiting unless otherwise specified.

EXAMPLE 1

Stoichiometric quantities of phthalic anhydride and 4,4'-bis(o-aminoanilino) biphenyl are melt condensed in the presence of phenol as a fluxing agent (50% volatile) for one hour at 250° C in a reaction vessel placed within a Wood metal bath. A prepolymer formed, which after cooling, was ground to -60 mesh and finally cured at 400° C for 1 hour. The prepolymer fused, refoamed and solidified within a few minutes to give a very tough foam structure.

EXAMPLE 2

The same procedure as shown in Example 1 was repeated except that the initial reaction before the prepolymer was finally cured, was conducted for a longer period of time, i.e. 16.25 hr. The results are shown in Table 1 below as well as the results of Example 1.

TABLE 1

EFFECT OF PROLONGED CURE AT 250° C ON INHERENT VISCOSITIES OF NABI POLYMERS

| Example | Acid Component | Tetramine | $\eta_{inh}$*(dl/g) after 250° C (Time, hr) | $\eta_{inh}$*(dl/g) after 400° C (Time, hr) | Comments |
|---|---|---|---|---|---|
| 1 | Phthalic Anhydride (PA) | BAB# | 0.26** (1.0) | 0.79**, 1.14 (1.0) | Tough foam |
| 2 | | | 1.14 (16.25) | 3.25 (1.0) | Tough foam |

* As 0.5% solution in $H_2SO_4$
** m-Cresol substituted as solvent
4,4'-bis(o-aminoanilino)biphenyl For the PA/BAB polymer additional time at 250° C increases the inherent viscosity considerably with an additional increase occurring during the postcure at 400° C.

The final PA/BAB polymer has a Tg of 344° C and was obtained as a foam of ~14 lb./ft.$^3$ density. TGA of this material under $N_2$ indicates a sharp weight loss starting at 520° C and containing for ~100° C. Weight loss at 800° C was 37% ($Y_C^{800}$ =63%), indicating equivalent thermal stability to that of conventional polybenzimidazoles derived from dicarboxylic acid esters.

COMPARATIVE EXAMPLES 1-4

The same reaction as in Examples 1 and 2 was conducted except that stoichiometric quantities of diphenyl esters of the various aromatic dicarboxylic acids shown in Table 2 below were reacted with 4,4'-bis(o-aminoanilino) biphenyl. The same reaction conditions as in Example 1 were employed.

TABLE 2

POLYMERIZATION REACTIONS OF 4,4'-BIS(o-AMINOANILINO)BIPHENYL WITH VARIOUS DIPHENYL ESTERS OF AROMATIC DICARBOXYLIC ACIDS

| Acid Component | $\eta_{inh}$ after* 1 hr at 250° C (m-cresol) | $\eta_{inh}$* after additional 1 hr at 400° C ($H_2SO_4$) | (m-cresol) | Apparent $T_g$** | Remarks |
|---|---|---|---|---|---|
| Diphenyl isophthalate | 0.07 | 0.23 | 0.27 | 287° | Brittle solid |
| Diphenyl-4,4'-bisbenzoate | 0.12 | 0.12 | 0.15 | 400°*** | Brittle solid |
| Diphenyl-4,4'-oxybisbenzoate | 0.09 | 0.39 | 0.41 | 308° | Tough solid |
| Diphenyl-2,4'-bisbenzoate | 0.15 | 0.25 | 0.21 | 248° | Brittle foam |

*0.5% solution at 25° C
**Measured by DSC at ΔT = 20° C/min in $N_2$, $T_g$ taken as the inflection point of the ΔT vs temperature curve
***Heated in $N_2$ to 580° C, held 10 min then rerun; $T_g$ transition appeared at 400° C It is evident from a comparison of the viscosity data in Tables 1 and 2 that the rate of polymerization for the present anhydride-tetraamine reaction is very much faster than the rate of polymerization of the estertetraamine reaction system.

The following examples show the effects of combining a cross-linking agent, specifically benzophenone tetracarboxylic dianhydride, with phthalic anhydride in the reaction with 4,4'-bis(o-aminoanilino)biphenyl.

EXAMPLE 3

A series of prepolymers were prepared in which the ratio of 4,4'-bis(o-aminoanilino)biphenyl to phthalic anhydride varied in the series 100/95, 100/90, . . . , 100/50 in 5 mole percent increments by heating a phenol fluxed mixture (~ 50% solids) from 250° C to 360° C over a 2 hour period under nitrogen. Phenol boiled out during the interim (0.5% remaining). The resulting cooled material varied from bright red brittle solids to dense foams as the stoichiometry approached unity.

The prepolymer formed in each case was then redissolved in hot phenol (~15% solids) in a test tube, cooled to ~75° C and the appropriate (stoichiometry for residual amine) amount of benzophenone tetracarboxylic dianhydride added. After solution had occurred the tubes were placed in a Wood's metal bath at 250° C and heated to 460° C over a one hour period. These experiments showed a general decrease in ultimate foam density to ~2.5 lb/ft$^3$ in the region of 100/80/20 to 100/70/25 (tetraamine/phthalic anhydride/dianhydride-hereinafter abbreviated as BAB/PA/BTDA) stoichiometry. Foam quality also appears to be superior in this region. FIG. 1 shows the trend in densitites as the stoichiometry was varied. The data in the figure do not represent optimization of the foaming conditions.

EXAMPLE 4

To optimize the foaming and polymerization of the BAB/PA/BTDA system, a series of experiments were conducted in a device which permits the unimpeded expansion of the N-arylenebenzimidazole product as it foams. The device used consists of an enclosure with a close fitting, movable top piece. As the polymer foams beneath the top, it exerts an upward force which moves the top upward as the polymer expands. The rising foam effectively seals the exposed periphery of the top between the container walls and the floating top thus preventing oxidation problems during the latter phase of foam consolidation.

The experiments were conducted in order to establish the optimum values for the following system variables:

1. Monomer ratio (BAB/PA/BTDA) to accommodate various crosslink densities
2. Flux/blowing agent concentration
3. Flux/blowing agent materials
4. Prepolymer formation (reaction time at temperature)
5. Heatup rate The first series of experiments, on 7.5 cm diameter billets, involved was simply combining the various monomers in the appropriate amount of solvent and heating, with stirring, to effect the solution. Each mixture was transferred to the restricted rise device and the temperature increased at the appropriate rate. All of the conditions are set forth in Table 3a.

A second procedure, also shown in Table 3a, was to combine the various monomers in the appropriate amount of solvent shown and allow partial reaction to occur by heating, with stirring, for a specified time at a particular temperature to form a prepolymer. The prepolymer was then heated to a rate systematically varied between 45 and 120 minutes up to one of two temperature limits, i.e. 175° C and 190° C. The solvent loss at both temperatures was negligible. After the prescribed reaction period, the molten prepolymer mass was allowed to cool, pulverized and ground to −60 mesh size.

An alternate method of prepolymer formation included heating the reactants at a ~30% volatile content followed by reducing the volatiles under vacuum to various levels. This latter technique was necessary to reduce the total volatile content to less than ~25% where the prepolymer viscosity becomes too high for adequate stirring during the initial heating.

After prepolymer formation, each prepolymer was charged into the foaming device, previously described. The temperature was raised in a forced air oven to either 350° F or 375° F (depending on prepolymer heating temperature) in ~30 minutes. The rate of temperature increase was then held to a particular value. Three discrete foaming temperature heatup rates were utilized; viz. 100° F/hour, 150° F/hour and 200° F/hour. The particular rate was followed to approximately 550° F when all the foaming activity had ceased. The foam was then heated to 650° F over a 20 minute period, held ten minutes, cooled and removed.

Visual examination of skin texture along with cell size distribution and configuration was made at this point. A segment of the foam was cut out to examine the interior cell structure.

Postcure of the polymer was conducted under dry nitrogen by slow (~200° F/hour) heatup to 775° F and held at that temperature for one hour. The materials were generally red-orange in color with acceptable toughness. The weight loss during postcure was generally ~4 to 6% and can be attributed to the effective free volatiles remaining in the foamed specimens after the initial foam forming sequence.

Phenol proved to be a most effective solvent/blowing agent. T-e overall densities obtained generally ranged between 4 and 8.5 lb/ft$^3$.

The foaming volume was increased in two steps from 5.0 cm diameter discs, 2–3 cm high to 15 cm diameter discs up to 4–5 cm in height. lower density was generally attainable with the larger volume but more irregularity in foam texture (more large voids) resulted. The insulative character of the foam, coupled with the larger volume and consequently longer heat flow paths is the prime causative factor.

Table 3a describes the results obtained from anhydride co-reactants with BAB. Mold changes were calculated to yield 4.0 lbs/ft$^3$ (pcf). The circular billet diameter was 7.5 cm with an ultimate foam rise calculated to be 5.5 cm for 4 pcf foam. In no case was the 4 pcf target density obtained. Foam rise heights are, of course, an inverse function of density. Table 3b shows similar results obtained on larger billet specimens. In this section the billet diameters were 15 cm, with an equal (5.5 cm) ultimate foam rise (at 4 pcf).

TABLE 3a

CROSSLINKED POLYMER FOAM PARAMETER STUDY
(7.5 cm Billet Diameter)

| Example | BAB/PA/BTDA Ratio Additive (wt. %) Solvent (wt. %) | Prepolymer Formation Conditions | Process After Prepolymer Formation | Heat-Up Rate (° F/min) | Ultimate Foam Density lb/ft$^3$ | Foam Appearance |
|---|---|---|---|---|---|---|
| 4-1 | 100/70/15 m-cresol (15) phenol (50) | None | — | 30 | 5.1 | Fair |

TABLE 3a-continued
CROSSLINKED POLYMER FOAM PARAMETER STUDY
(7.5 cm Billet Diameter)

| Example | BAB/PA/BTDA Ratio Additive (wt. %) Solvent (wt. %) | Prepolymer Formation Conditions | Process After Prepolymer Formation | Heat-Up Rate (° F/min) | Ultimate Foam Density lb/ft³ | Foam Appearance |
|---|---|---|---|---|---|---|
| 4-2 | 100/70/15 DC 197 (1) m-cresol (15) phenol (50) | " | — | 30 | 6.4 | Fair |
| 4-3 | 100/70/15 ethanol (100) phenol (20) | " | — | 10 | 10.7 | Good |
| 4-4 | 100/70/15 ethanol (25) phenol (10) | " | — | 10 | 8.5 | Good |
| 4-5 | 100/80/10 ethanol (25) phenol (20) | " | — | 10 | 9.1 | Poor |
| 4-6 | 100/85/7.5 ethanol (25) phenol (10) | " | — | 10 | 8.5 | Fair |
| 4-7 | 100/90/5 ethanol (25) phenol (10) | " | — | 12 | 10.2 | Poor |
| 4-8 | 100/90/5 ethanol (25) phenol (10) | " | — | 10 | 9.6 | Very poor |
| 4-9 | 100/90/5 DC 193 (2) ethanol (25) phenol (10) | " | — | 10 | 24.1 | Very poor, gross voids |
| 4-10 | 100/90/5 DC 193 (0.5) ethanol (25) phenol (10) | " | — | 10 | 18.2 | Very poor |
| 4-11 | 100/90/5 phenol 33 | Advanced 45 min at 175° C | Cooled to −60 mesh ground | 6.5 | 7.2 | Fair |
| 4-12 | 100/90/5 phenol 33 | Advanced 60 min at 175° C | Cooled, ground to −60 mesh | 6.5 | 6.4 | Good |
| 4-13 | 100/90/5 phenol 20 | Advanced 45 min at 175° C | Cooled ground to −60 mesh | 6.5 | 6.3 | Fair |
| 4-14 | 100/90/5 except m-cresol (30) | Advanced 45 min at 175° C | Cooled ground to −60 mesh | 6.5 | 6.1 | Good |
| 4-15 | 100/90/5 m-cresol (15) | Advanced 45 min at 175° C | Cooled ground to −60 mesh | 6.5 | 11.3 | Very poor |
| 4-16 | 100/90/5 m-cresol (20) | Advanced 45 min at 175° C | Cooled ground to −60 mesh | 6.5 | 5.7 | Very poor |
| 4-17 | 100/90/5 m-cresol (15%) | Advanced 90 min at 175° C | Cooled ground to −60 mesh | 6.5 | 7.5 | Fair |

TABLE 3b
CROSSLINKED POLYMER FOAM PARAMETER STUDY
(15 cm Billet Diameter)

| Example | BAB/PA/BTDA Ratio Additive (wt. %) Solvent (wt. %) | Prepolymer Formation Conditions | Process After Prepolymer Formation | Heat-UP Rate (° F/min) | Ultimate Foam Density (lb/ft³) | Foam Appearance |
|---|---|---|---|---|---|---|
| 4-18 | 100/90/5 phenol (33) | Advanced 45 min at 175° C | Cooled, ground to −60 mesh | 3.2 | 4.3 | Fair |
| 4-19 | 100/90/5 phenol (33) | Advanced 45 min at 175° C | Cooled, ground to −60 mesh | 1.6 | 4.8 | Good |
| 4-20 | 100/90/5 phenol (33) | Advanced 45 min at 175° C | Cooled, ground to −60 mesh | 2.2 | 4.4 | Fair |
| 4-21 | 100/90/5 phenol (33) | Advanced 45 min at 175° C | Cooled, ground to −60 mesh | 2.2 | 4.4 | Fair |
| 4-22 | 100/90/5 phenol (33) | Advanced 60 min at 190° C | Cooled, ground to −60 mesh | 3.2 | 5.3 | Good |
| 4-23 | 100/90/5 phenol (30) | Advanced 45 min at 190° C | Cooled, ground to −60 mesh | 3.2 | 5.2 | Good |
| 4-24 | 100/90/5 phenol (25) | Advanced 45 min at 190° C | Cooled, ground to −60 mesh | 3.2 | 4.9 | Good |
| 4-25 | 100/90/5 phenol (20) | Advanced 45 min at 190° C | Cooled, ground to −60 mesh | 3.2 | 4.2 | Poor |
| 4-26 | 100/90/5 phenol (17.5) | Advanced 45 min at 190° C | Cooled, ground to −60 mesh | 3.2 | 6.3 | Poor |
| 4-27 | 100/90/5 phenol (30) | Advanced 75 min at 190° C | Cooled, ground to −60 mesh | 2.2 | 5.0 | Fair |
| 4-28 | 100/90/5 phenol (25) | Advanced 75 min at 190° C | Cooled, ground to −60 mesh | 2.5 | 5.8 | Fair |
| 4-29 | 100/90/5 *Nucleation Sites (10) phenol (30) | Advanced 45 min at 190° C | Cooled, ground to −60 mesh | 5 | 8.4 | Good |
| 4-30 | 100/90/5 *Nucleation Sites (10) phenol 27.5 | Advanced 75 min at 190° C | Cooled, ground to −60 mesh | 2.2 | 8.4 | Good |
| 4-31 | 100/90/5 phenol (30) | Advanced 75 min at 190° C | Cooled, ground to −60 mesh | 3.2 | 6.2 | Good |
| 4-32 | 100/90/5 | Advanced 75 min | Cooled, ground | 3.2 | 10.6 | Good |

TABLE 3b-continued
CROSSLINKED POLYMER FOAM PARAMETER STUDY
(15 cm Billet Diameter)

| Example | BAB/PA/BTDA Ratio Additive (wt. %) Solvent (wt. %) | Prepolymer Formation Conditions | Process After Prepolymer Formation | Heat-UP Rate (° F/min) | Ultimate Foam Density (lb/ft³) | Foam Appearance |
|---|---|---|---|---|---|---|
|  | *Nucleation Sites (10) phenol (30) | at 190° C | to −60 mesh |  |  |  |
| 4-33 | 100/90/5 *Nucleation Sites phenol (30) | Advanced 75 min at 190° C | Cooled, ground to −60 mesh | 3.2 | 7.0 | Good |
| 4-35 | 100/90/5 phenol (30) | Advanced 100 min at 190° C | Cooled, ground to −60 mesh | 3.2 | 4.8 | Poor |
| 4-36 | 100/90/5 phenol (30) | Advanced 90 min at 190° C | Cooled, ground to −60 mesh | 1.6 | 7.6 | Fair |
| 4-37 | 100/90/5 phenol (30) | Advanced 100 min at 190° C | Cooled, ground to −60 mesh | 1.6 | 8.1 | Good |
| 4-38 | 100/90/5 phenol (30) | Advanced 90 min at 190° C | Cooled, ground to −60 mesh | 3.2 | 5.0 | Excellent skin, poor internally |
| 4-39 | 100/90/5 Ethyleneglycol (30) | Advanced 75 min at 190° C | Cooled, ground to −60 mesh | 3.2 | — | No foaming action even to 400° C for 30 min. |
| 4-40 | 100/90/5 phenol (30) | Advanced 100 min at 190° C | Cooled, ground to −60 mesh | 1.6 | 6.8 | Fair |
| 4-41 | 100/90/5 phenol (30) | Advanced 90 min at 190° C | Cooled, ground to −60 mesh | 3.2 | 6.2 | Fair |
| 4-42 | 100/90/5 phenol (30) | Advanced 90 min at 190° C | Cooled, ground to −60 mesh | 1.6 | 6.2 | Poor |
| 4-43 | 100/90/5 phenol (30) | Advanced 110 min at 190° C | Cooled, ground to −60 mesh | 3.2 | 11.5 | Dense skin |
| 4-44 | 100/94/3 phenol (30) | Advanced 100 min at 190° C | Colled, ground to −60 mesh | 3.2 | 8.0 | Good |
| 4-45 | 100/94/3 phenol (30) | Advanced 100 min at 190° C | Cooled, ground to −60 mesh | 1.6 | 8.9 | Fair |
| 4-46 | 100/94/3 phenol (30) | Advanced 120 min at 190° C | Cooled, ground to −60 mesh | 3.2 | 5.9 | Good |
| 4-47 | 100/94/3 phenol (30) | Advanced 100 min at 190° C | Stripped to 22% vols, cooled & reground to −60 mesh | 3.2 | 5.6 | Good |
| 4-48 | 100/94/3 phenol (30) | Advanced 100 min at 190° C | Stripped to 20% vols, cooled & reground to −60 mesh | 3.2 | 6.6 | Fair |
| 4-49 | 100/94/3 phenol (30) | Advanced 100 min at 190° C | Stripped to 25% vols, cooled & reground to −60 mesh | 3.2 | 5.2 | Good |

*Finely (−20 mesh) ground cured polymer (foam) added to the ground prepolymer prior to final foaming operation.

Having now fully described the invention, it will be apparent to one of ordinary skill in the art that many changes and modifications can be made thereto without departing from the spirit or scope of the invention as set forth herein.

What is claimed is:

1. A poly-N-arylene benzimidazole foam having a density within the range of 1.5 to 10 lb/ft³, comprising the condensation product of an ortho substituted aromatic dicarboxylic acid anhydride, an aromatic tetracarboxylic acid dianhydride and an organic tetramine selected from the group consisting of

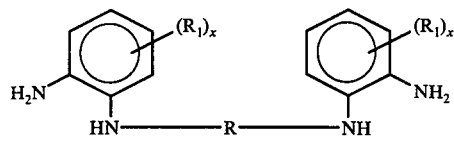

wherein R is $C_{6-12}$ arylene,

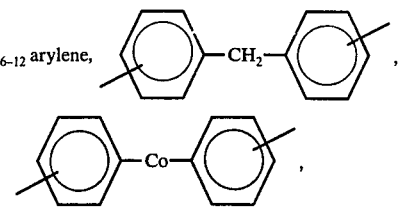

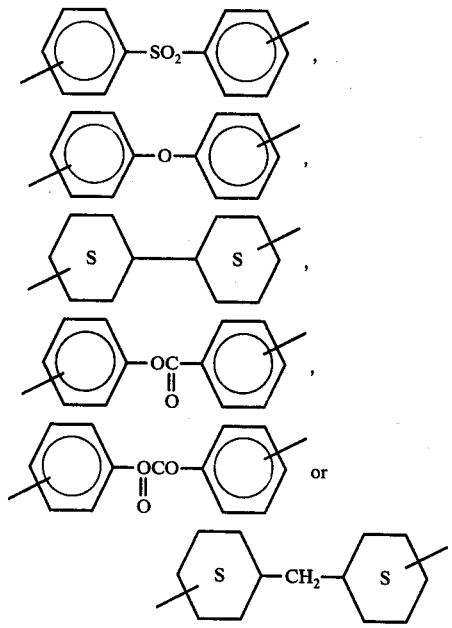

2. The benzimidazole foam of claim 1, wherein the dianhydride content is within the range of 2.5 mole % to 100 mile % based on the dicarboxylic acid anhydride component.

3. The method of claim 2, wherein said tetracarboxylic dianhydride cross-linking agent is 3,3′,4,4′-benzophenone tetracarboxylic dianhydride, 1,8,5,7-naphthalene tetracarboxylic acid dianhydride or pyromellitic dianhydride.

4. The benzimidazole foam of claim 1, wherein the dicarboxylic acid anhydride is phthalic anhydride, the dianhydride is 3,3′,4,4′-benzophenone tetracarboxilic dianhydride and the tetramine is 4,4′-bis (o-aminoanilino) biphenyl.

5. A method for preparing a poly-N-arylene benzimidazole foam, which comprises:

(a) mixing the anhydride, dianhydride and tetramine components of claim 1 in the presence of 5 to 50% phenol, based on the total weight of the mixture, (b) heating the mixture to a temperature within the range of about 300° to 400° F to obtain a prepolymer, (c) heating the prepolymer at a programmed rate between 100° and 300° F per hour to a temperature within the range of about 500° to 600° F to complete polymerization, cross-linking and foaming of the reactants; all heating steps being carried out under substantially oxygen free conditions.

6. The method of claim 5 wherein the foam is further heated, under substantially oxygen free conditions, to a temperature between about 625° and 675° F, maintained at this temperature for about 10 to 45 minutes, and postcured at a temperature between about 750° and 790° F for about 40 to 80 minutes.

* * * * *